Oct. 7, 1969     W. S. EVERETT     3,470,979

FLUID PULSATION DAMPENER WITH THIMBLE

Filed Oct. 10, 1967

INVENTOR.
WILHELM S. EVERETT
BY *Elliott & Pastoriza*
ATTORNEYS

United States Patent Office 3,470,979
Patented Oct. 7, 1969

3,470,979
FLUID PULSATION DAMPENER WITH THIMBLE
Wilhelm S. Everett, 126 W. Santa Barbara St.,
Santa Paula, Calif. 93060
Filed Oct. 10, 1967, Ser. No. 674,283
Int. Cl. F01n 1/08
U.S. Cl. 181—56                             2 Claims

ABSTRACT OF THE DISCLOSURE

A fluid pulsation dampener is provided for alleviating fluid surges in lines from pumps, compressors, and the like and silencing or filtering fluid-borne noises. The dampener includes inlet and outlet chambers for in-line connection to a pipe carrying pulsating fluid. The inlet chamber includes a thimble shaped device having a closed end wall and a plurality of side wall openings for receiving inlet fluid. The dimensioning of the thimble openings and the thimble structure itself is such as to blunt the velocity profile of fluid received in the inlet chamber compared to the velocity profile of fluid received in the chamber in the absence of the thimble device such that peak shock waves within the chamber are substantially eliminated. In addition, fluid-borne noise frequencies are increased by the thimble structure and thus more effectively silenced or filtered for given wavelength dimensioning of the structure. The incorporation of the thimble device thus renders the pulsation dampener structure useful for substantially reducing fluid or noises resulting from high velocity jet fluid as might be received from reducing valves and the like.

---

This invention relates generally to fluid pulsation dampening devices and more particularly to an improved pulsation dampener over that shown in my United States Patent No. 2,993,559.

In my above referred-to patent, there is described a fluid pulsation dampener for in-line connection in a pipe carrying fluid. This device comprises an elongated shell having a closed first end defining an inlet opening and a closed second end defining an outlet opening. Partitions are provided within the shell defining an inlet chamber, a central chamber, and an outlet chamber. Off-axis tubes are provided in the shell connecting respectively the inlet chamber with the central chamber, the central chamber with the outlet chamber, and a direct connection between the inlet chamber and outer chamber. The fluid stream through the device is thus diverted or split and the dimensioning of the tubes and chambers is such that fluid surges are canceled over a relatively wide frequency band.

The foregoing pulsation dampener has been extremely useful and effective when employed with reciprocating pumps and compressors and centrifugal type pumps and compressors.

It has been found that these very same units may be very useful in pulsation dampening of liquids, gases or steam when installed downstream of reducing valves. However, when employed in this manner, fluid-borne noises in the jet stream are not effectively attenuated. This is a consequence principally of the extremely high velocity jet stream inlet to the dampener resulting in peak shock waves. In order words, the velocity profile of incoming fluid when the dampener is used in these latter applications is such that fluid-borne noises can pass through the unit.

With the foregoing in mind, it is a primary object of the present invention to provide an improved pulsation dampener wherein the foregoing problems of fluid-borne noises are overcome to the end that a wider application of use of the dampener is realizable.

More particularly, it is an object to provide an improved pulsation fluid dampener over that shown in my above referred to United States patent wherein the device may be used for in-line installation at the downstream ends of reducing valves and the like to attenuate fluid-borne noises resulting from the high velocity jet entering the device from such reducing valves.

Briefly, these and other objects and advantages of this invention are attained by incorporating in combination with a pulsation dampener of the type described in my above referred to United States patent, a thimble shaped device in the inlet expansion chamber. This device is dimensioned to be received with its ouen end covering the inlet opening and its closed end axially spaced in opposing relationship to the inlet opening. The closed end of the thimble serves to divert fluid entering the device laterally, the wall of the thimble shaped structure including a plurality of openings of substantially smaller diameter than the diameter of the inlet opening to provide communication between the inlet opening and the inlet chamber. As a consequence of this construction, the velocity profile of high jet fluid received in the inlet chamber is blunted as compared to the velocity profile of fluid received in the chamber in the absence of the thimble device. In addition the frequency spectrum of fluid-borne noises is shifted to a higher band. The result is that peak shock waves within the chamber along with other fluid-borne noises are substantially reduced.

A better understanding of the invention will be had by now referring to a preferred embodiment as illustrated in the accompanying drawings, in which.

Figure 1:
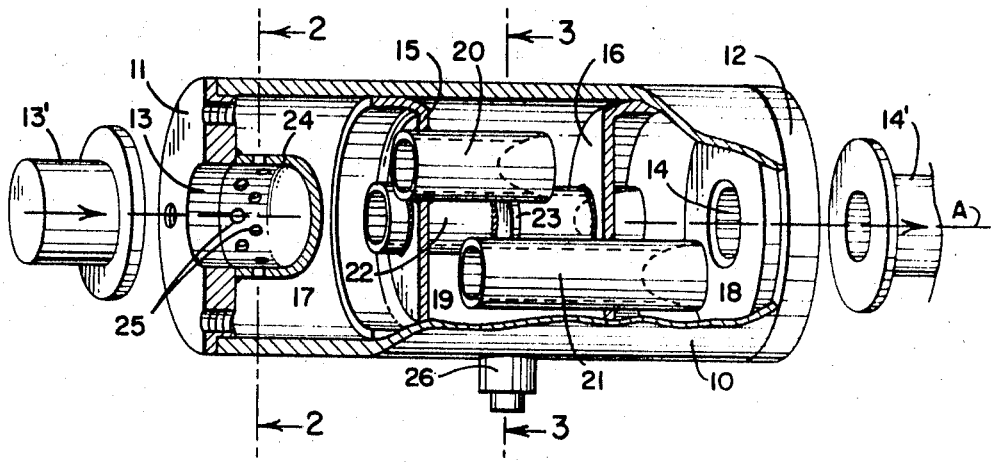
FIGURE 1 is a cutaway perspective view of the improved fluid pulsation dampener of this invention preparatory to being inserted in an in-line connection for a pipe carrying high velocity pulsating fluid.

Referring first to FIGURE 1 the pulsation dampener comprises an elongated shell 10 having an inlet end closure 11 and an outlet end closure 12. The inlet and outlet closures define inlet and outlet openings 13 and 14, respectively, for in-line connection to a pipe carrying fluid such as indicated at 13' and 14'.

The interior of the shell 10, as in the structure described in my heretofore referred to United States patent, includes first and second partitions 15 and 16 dividing the interior into an inlet chamber 17, an outlet chamber 18 and a central chamber 19. A first tube 20 passes through the partition 15 to connect the inlet chamber 17 with the central chamber 19. A second tube 21 passes from the central chamber 19 to the outlet chamber 18; and a third tube 22 passes directly from the inlet chamber 17 through both partitions 15 and 16 to the outlet chamber 18. The tubes may be stabilized by means of a support web 23 connecting to the adjacent outer walls of the tubes in the central chamber 19 as shown. It will be evident that the axes of the various tubes are displaced from each other such that the ends of the tubes 20 and 21 in the central chamber 19 can extend passed each other.

In accordance with the present invention, there is incorporated within the inlet chamber 17 a thimble shaped device 24 having a closed curved end wall opposed to the inlet opening 13 and including a plurality of openings 25 in its lateral wall.

Figure 2:
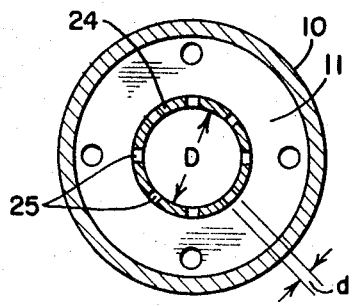
FIGURE 2 is a cross section taken in the direction of the arrows 2—2 of FIGURE 1.

With reference to the cross section of FIGURE 2, the diameter of the particular openings 25 is designated $d$, each diameter being substantially smaller than the diimeter of the inlet opening 13 designated D. However, the total cross-sectional area of the various openings 25 is preferably made at least equal to the cross-sectional area of the inlet opening 13.

Figure 3:
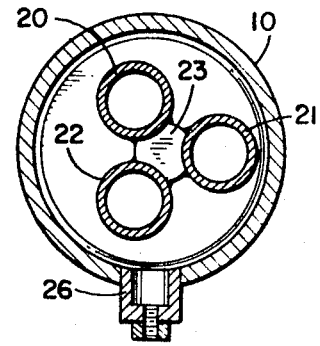
FIGURE 3 is another cross section taken in the direction of the arrows 3—3 of FIGURE 1.

A suitable fluid drain 26 may be provided in the lower portion of the central chamber 19 as illustrated in both FIGURES 1 and 3. With particular reference to FIGURE 3, the lateral displacement of the axes of the various tubes 20, 21, and 22 from the central axis A of the shell 10 is shown.

Figure 4:
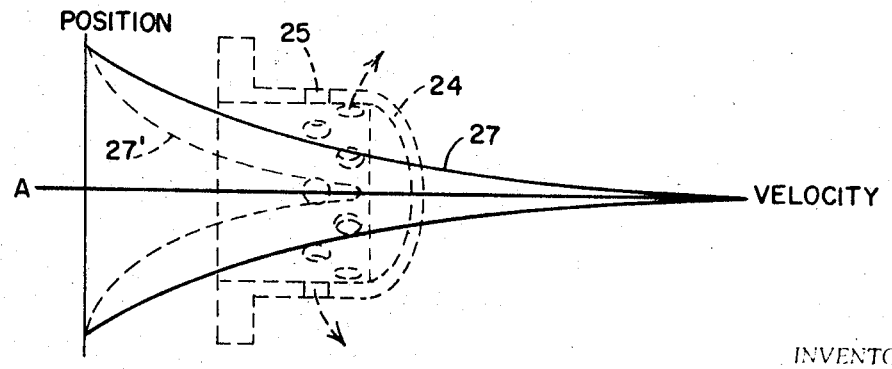
FIGURE 4 is a velocity profile plot useful in explaining certain features of the invention.

FIGURE 4 illustrates at 27 the velocity profile of incoming jet fluid to the inlet chamber 17 of FIGURE 1 in the absence of the thimble shaped device 24. It will be evident that along the central axis A of the dampener, the velocity is quite high and can result in peak shock waves. If the thimble shaped device 24 is employed, this velocity profile is blunted to a form similar to that illustrated by the dashed lines 27' in FIGURE 4, the presence of the thimble also being illustrated in dashed lines.

From the foregoing description, the operation of the improved pulsation dampener will be evident.

The dampener as shown in FIGURE 1 is inserted in a line 13', 14' in series. Where this line constitutes the downstream side of a reducing valve, the entering fluid, whether it be liquid, steam, or gas, received through the inlet opening 13 of the dampener will have a velocity profile 27 as described in FIGURE 4 in the absence of the thimble device 24 of FIGURE 1. The provision of the interior curved enclosure of the thimble device in axially opposing relationship to the inlet opening 13 results in the jet stream impinging on this enclosure and being substantially dispersed, the fluid being diverted laterally through the various openings 25. The initial velocity profile is thus substantially blunted as already described in conjunction with FIGURE 4.

Further, the small diameter openings 25 function to reshape the frequency characteristic of fluid-borne noises by shifting these frequencies to substantially increased values. Thus, considering the formula:

$$f = S \cdot \frac{V}{d}$$

where $f$ equals frequency, $S$ is Struhul's number, $V$ the velocity of fluid from the opening, and $d$ the diameter of the opening, it will be evident that the reduction in the diameter of each opening as compared to the inlet opening diameter D results in an increasing in the frequency $f$. As a result, the wavelengths of noises to be silenced or filtered are shorter and the dimensioning of the chambers and tubes in terms of these wavelengths is such that increased efficiency in the filtering of the fluid-borne noises is realized.

From the foregoing description, it will thus be evident that the present invention has described an improved pulsation dampener of greater versatility and wherein all of the various objects set forth heretofore are fully realized.

What is claimed is:

1. A fluid pulsation dampener for an in-line connection to a pipe carrying pulsating fluid, comprising, in combination: an elongated shell; an inlet end closure at one end of said shell defining an inlet opening; an outlet end closure at the other end of said shell defining an outlet opening substantially in line with said inlet opening so that said shell may be interposed directly in series with said pipe; partition and tube assembly means within said shell defining with said inlet and outlet end closures inlet and outlet chambers respectively, said chambers being in communication with each other through said tube assembly means; and a fluid passage means in said inlet chamber in the form of a thimble shaped device having its open end covering said inlet opening and its closed end in axial alignment with said inlet opening, said closed end being of interior concave shape such that entering fluid impinges on said closed end and is diverted laterally, the walls of said thimble device including a plurality of openings each of diameter substantially less than the diameter of said inlet opening providing communication between said inlet opening and said inlet chamber, the total cross-sectional area of said plurality of openings being substantially equal to the cross-sectional area of said inlet opening such that the velocity profile of fluid in said inlet chamber is substantially blunted as compared to the velocity profile of fluid in said inlet chamber in the absence of said thimble device whereby fluid shock waves in said shell are substantially eliminated and whereby the dominant frequencies of fluid-borne noises are substantially increased to render more effective the wavelength dimensioning of said inlet and outlet chambers and said partition and tube assembly means in attenuating such noises.

2. A fluid pulsation dampener according to claim 1, in which said partition and tube assembly means includes first and second partitions transversely disposed in said shell to define a central chamber between said inlet and outlet chambers; a first open ended tube passing through said first partition to place said inlet chamber in communication with said central chamber; a second open ended tube passing through said second partition along an axis laterally spaced from the axis of said first tube to place said central chamber in communication with said outlet chamber, the open ends of said first and second tubes in said central chamber extending past each other along their respective axes; and a third tube passing through both of said partitions to place said inlet chamber directly in communication with said outlet chamber, said tubes and chambers being dimensioned to cooperate with said thimble device to effect pulsation dampening of said fluid passing from said thimble device into said inlet chamber.

References Cited

UNITED STATES PATENTS

| | | | |
|---|---|---|---|
| 2,392,989 | 1/1946 | Kliewer | 181—56 |
| 2,455,965 | 12/1948 | Wohlberg | 181—58 XR |
| 2,993,559 | 7/1961 | Everett | 181—57 XR |

FOREIGN PATENTS

| | | |
|---|---|---|
| 514,944 | 11/1920 | France. |
| 1,014,768 | 6/1952 | France. |
| 563,383 | 8/1944 | Great Britain. |

ROBERT S. WARD, JR., Primary Examiner

U.S. Cl. X.R.

181—57